(12) United States Patent
Hargenrader et al.

(10) Patent No.: US 7,990,079 B2
(45) Date of Patent: Aug. 2, 2011

(54) METHOD AND APPARATUS FOR PROVIDING SELECTIVELY COLORED LIGHT

(75) Inventors: John T. Hargenrader, Brighton, MI (US); Mark E. Dixon, Farmington Hills, MI (US)

(73) Assignee: Magna International Inc., Aurora (CA)

( * ) Notice: Subject to any disclaimer, the term of this patent is extended or adjusted under 35 U.S.C. 154(b) by 753 days.

(21) Appl. No.: 12/026,992

(22) Filed: Feb. 6, 2008

(65) Prior Publication Data
US 2009/0196031 A1 Aug. 6, 2009

(51) Int. Cl.
*H05B 37/00* (2006.01)
(52) U.S. Cl. ........ 315/312; 315/297; 315/294; 362/227; 362/231; 362/613
(58) Field of Classification Search .................. 315/291, 315/293–295, 297, 312, 362; 362/227, 230, 362/231, 236, 601, 612, 613
See application file for complete search history.

(56) References Cited

U.S. PATENT DOCUMENTS

| | | | |
|---|---|---|---|
| 5,008,595 A * | 4/1991 | Kazar | 315/178 |
| 5,113,387 A | 5/1992 | Goldsmith et al. | |
| 6,020,593 A | 2/2000 | Chow et al. | |
| 6,150,774 A * | 11/2000 | Mueller et al. | 315/291 |
| 6,808,287 B2 * | 10/2004 | Lebens et al. | 362/184 |
| 7,114,840 B2 * | 10/2006 | Hamrick | 362/613 |
| 7,164,110 B2 | 1/2007 | Pitigoi-Aron et al. | |
| 7,186,000 B2 | 3/2007 | Lebens et al. | |
| 7,308,296 B2 * | 12/2007 | Lys et al. | 600/407 |
| 7,388,230 B1 * | 6/2008 | Lebby et al. | 257/89 |

* cited by examiner

*Primary Examiner* — Haissa Philogene
(74) *Attorney, Agent, or Firm* — Honigman Miller Schwartz and Cohn LLP

(57) ABSTRACT

An apparatus for providing selectively-colored light is disclosed. The apparatus includes a circuit having a plurality of diodes each including an anode and a cathode, wherein the plurality of diodes include a first diode that emits a first light defined by a first wavelength, a second diode that emits a second light defined by a second wavelength, and a third diode that emits a third light defined by a third wavelength, wherein a summation of one or more of the first, second and third light defines a selectively-colored light; and a controller including a first output connected to the anode of the first diode, and the cathode of the second diode, a second output connected to the cathode of the first diode, the anode of the second diode, and the anode of the third diode, and a third output connected to the cathode of the third diode. A method is also disclosed.

18 Claims, 4 Drawing Sheets

METHOD AND APPARATUS FOR PROVIDING SELECTIVELY COLORED LIGHT

TECHNICAL FIELD

The invention relates in general to a method and apparatus for providing selectively-colored light.

BACKGROUND

There appears to be a ubiquitous trend to provide or customized goods, products or services. As such, a need appears to exist for a method and apparatus for providing selective light that may be associated with any desirable good, product or service, such as, for example, an automotive vehicle.

BRIEF DESCRIPTION OF THE DRAWINGS

The disclosure will now be described, by way of example, with reference to the accompanying drawings, in which.

DETAILED DESCRIPTION

The Figures illustrate an exemplary embodiment of a method and apparatus for providing selective light in accordance with an embodiment of the invention. It is to be generally understood that the nomenclature used herein is simply for convenience and the terms used to describe the invention should be given the broadest meaning by one of ordinary skill in the art.

Figure 1:
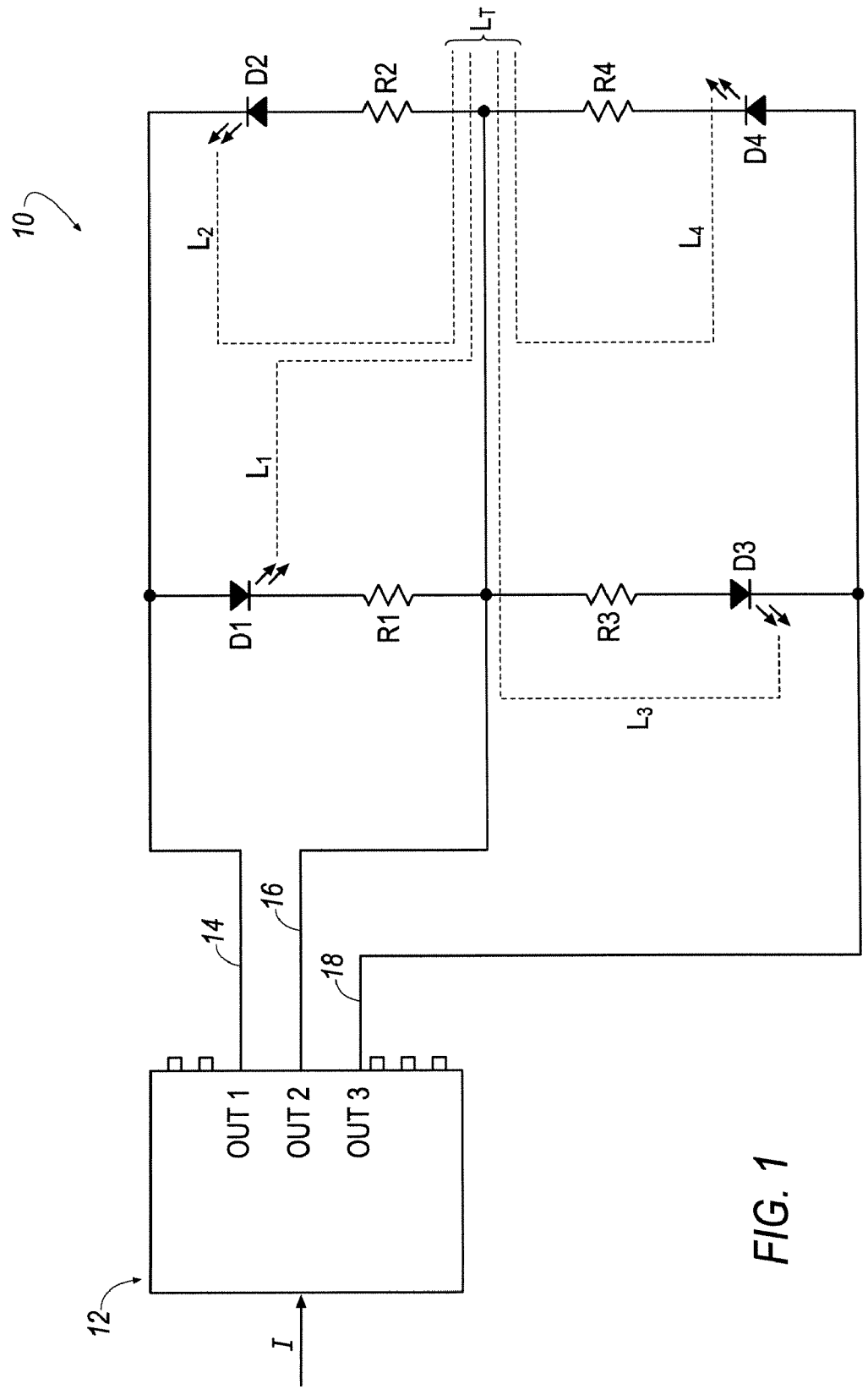
FIG. 1 is a circuit in accordance with an exemplary embodiment of the invention.

Referring to FIG. 1, the circuit is shown generally at 10 according to an embodiment. The circuit 10 includes a controller, which is shown generally at 12 and a plurality of light emitting diodes (LEDs), D1-D4, and resistors R1-R4 connected to controller 12. In an embodiment, four diodes, D1-D4, and four resistors, R1-R4, are included in circuit 10.

In an embodiment, first resistor, R1, is connected to the cathode of the first diode, D1. In an embodiment, second resistor, R2, is connected to the anode of the second diode, D2. In an embodiment, third resistor, R3, is connected to the anode of the third diode, D3. In an embodiment, fourth resistor, R4, is connected to the cathode of the fourth diode, D4. After consulting the present disclosure, it will be readily recognized that the position of the resistors with respect to the diodes are not limited to the exemplary embodiment such that one of ordinary skill will recognize alternate arrangements for the resistors which may be based on design considerations and desired output characteristics.

With continued references to FIG. 1, controller 12 includes a plurality of output pins, three of which are labeled generally OUT1, OUT2 and OUT3. Connected, respectively, to each of the three output pins OUT1-OUT3 are a first transmission line 14, or first node, a second transmission line 16, or second node, and a third transmission line 18, or third node. It will be appreciated that any suitable controller may be provided and the invention hereof should not be limited by any aspect of the controller.

In an embodiment, first transmission line 14 is directly connected to the anode of the first diode, D1, and directly connected to the cathode of the second diode, D2. In an embodiment, second transmission line 16 is commonly, and directly, connected to each of the four resistors R1-R4. In an embodiment, third transmission line 18 is connected to the cathode of third diode, D3, and the anode of fourth diode, D4. The disclosure hereof will refer to high voltage and low voltage which, to facilitate ease of disclosure, will exemplarily refer to 0V and 5V, respectively. However, it is to be appreciated that the voltages thereof should not be used to limit the invention and one of ordinary skill in the art will recognize that various voltages may be used provided the voltages utilized are sufficient to activate the diode (i.e., the voltage may be designated at any level above the band gap energy of the diode) which may be dependent upon the diode chemistry that makes the emitted wavelength (commonly known as Vf—forward voltage drop). After considering the disclosure hereof, these and other considerations should become apparent and the invention should not be limited thereby.

Moreover, and in the same regard, when considering the teachings of the disclosure hereof, one of ordinary skill will appreciate that the arrangement between the resistance elements and the transmissions lines may be alternatively arranged provided the polarity of the diodes is sufficiently maintained such that there exists a single current path when first transmission line 14 is high and second transmission line 16 is low, and second transmission line 16 is hi and first transmission line 14 is low. For example, it will be appreciated that, in an embodiment, cathodes of D1 and D2 cannot be connected to the same node or transmission line.

In an embodiment, when controller 12 permits current to pass through one or more of the diodes, D1-D4, which resultant creates a voltage drop there across, such diode or diodes are activated to emit light, which is generally represented by L1-L4. In an embodiment, the light, L1-L4, emitted from each of the diodes, D1-D4, may defined by a unique wavelength that is different from each other. In an alternative embodiment, however, the light emitted from each of the diodes may not be unique.

In an embodiment, a summation of one or more of the light, L1-L4, emitted from each diode, D1-D4, defines a selectively-colored light, $L_T$. In an embodiment, the selectively-colored light, $L_T$, is defined by light that is inclusive to the visible spectrum approximately ranging between 700 nm and 400 nm. However, it will be appreciated that any wavelength may be utilized and the invention should not be limited to the visible spectrum. For example, in an embodiment one or more of the diodes, in an embodiment, D4, may be provided to emit a wavelength in the ultraviolet ("UV") wavelength range, which may be arranged to exite phosphors printed on a nearby substrate (or the like) which would appear when such UV diode is activated. Moreover, in an embodiment, one or more of the diodes, in an embodiment, D4, may be provided to emit a wavelength in the infrared range.

Moreover, in an embodiment, one of the diodes, for example, D4, may be provided as a white light. It will be appreciated, however, that three diodes are sufficient to access any wavelength within the visible spectrum.

In an embodiment, for example, the diode, D1, may be defined to be a red diode by emitting light, L1, having a wavelength between approximately 780 nm-622 nm. The red diode, D1, may comprise, for example, an aluminum gallium arsenide (AlGaAs) composition.

In an embodiment, for example, the diode, D2, may be defined to be a green diode by emitting light, L2, having a wavelength between approximately 577 nm-492 nm. The green diode, D2, may comprise, for example, an aluminum gallium phosphide (AlGaP) composition.

In an embodiment, for example, the diode, D3, may be defined to be a blue diode by emitting light, L3, having a wavelength between approximately 492 nm-455 nm. The blue diode, D3, may comprise, for example, a gallium nitride (GaN) composition, or, an indium gallium nitride (InGaN) composition.

In an embodiment, for example, the diode, D4, may be a white diode. Although it is known in the art that "white light" is a mixture of colors of the visible spectra between approximately 780 nm-390 nm, the diode, D4, does not necessarily comprise a cluster of red, green and blue diodes. For example, the white diode, D4, may comprise a diode that is covered with, for example, a yellowish phosphor coating due to the fact that yellow stimulates the red and green receptors in the eye. Accordingly, in an embodiment, the diode may be, for example, a blue diode that emits blue light, and, when covered with a yellowish phosphor coating, the resulting mix of blue and yellow color gives the appearance of white light, L4, emitted from the diode, D4, to the eye. In an embodiment, the white diode, D4, may comprise, for example, GaN, and, the coating may comprise cerium (Ce).

In an embodiment, the current drop and corresponding on/off state of each of the diodes, D1-D4, is controlled by the activation signal directed to each diode, D1-D4 via OUT1-OUT3. It will be recognized, based on this disclosure, that the intensity of the emitted light, L1-L4 can be a function of the duty cycle of OUT1-OUT3. After considering the inventive concepts described herein, it will be recognized that the variance of OUT2 defines the selective output of the lights L1-L4.

Figure 2:
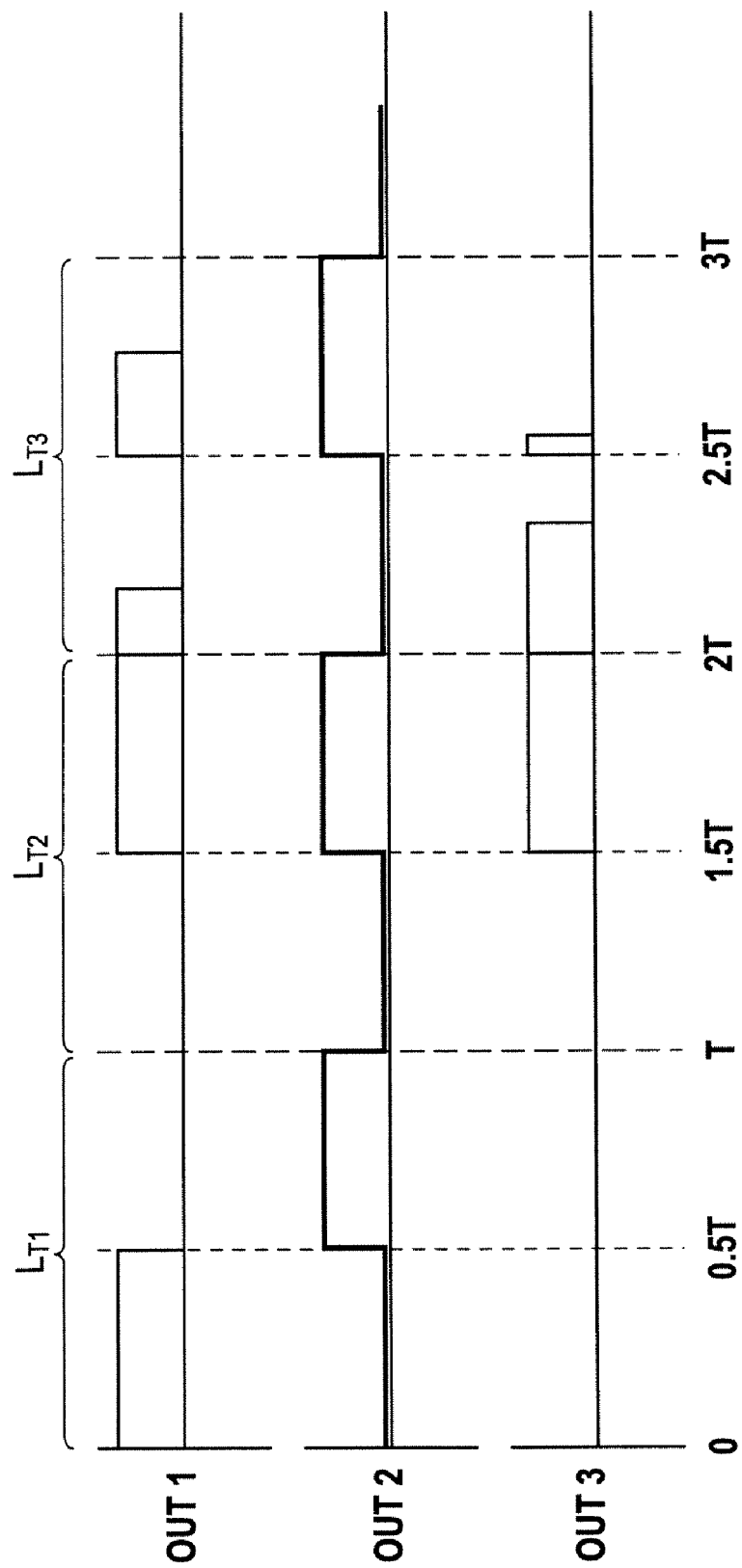
FIG. 2 is a timing diagram associated with the circuit of FIG. 1 in accordance with an exemplary embodiment of the invention.

Referring to the examples set forth FIG. 2, a 50% duty cycle PWM control signal is provided from output pin OUT2. It will be appreciated that this exemplary duty cycle should not be used to limit the invention and the general principles of the invention can be practiced with any range of duty cycles. It is preferred, however, that when using the circuit to emit light in the visible spectrum, that the duty cycle is selected in a range that can not be perceived by the human eye (so as to avoid "flickering"). In an embodiment, the frequency of the PWM signal is preferably greater than approximately 120 Hz to prevent this phenomenon.

In an embodiment and in conjunction with the arrangement of the diodes, D1-D4, shown in the circuit diagram 10, when the PWM control signal provided from OUT2 is low, only the first and fourth diodes D1, D4 may be permitted to emit light L1, L4, and, conversely, when the PWM control signal provided from OUT2 is high, only the second and third diodes D2, D3 may be permitted to emit light, L2, L3. In an embodiment, it will be appreciated that a diode activation signal provided from the controller 12 at output pins OUT1, OUT3 in combination with OUT2 determines the desired activation of each of the diodes, D1-D4. For example, in an embodiment as seen in FIG. 2, from 0 T to 0.5 T, OUT1 is high, OUT2 is low and OUT3 is low thereby exclusively providing light, L1, from the first diode, D1. From 0.5 T to T, OUT1 and OUT3 are both low while OUT2 is high; accordingly, light, L2, L3 is provided from diodes, D2, D3.

In an embodiment, therefore, for the first period, 0 to T, the circuit 10 emits unsaturated, selectively-colored light, $L_{T2}$, that includes a mixture of light L1, L2 and L3 emitted from the first, second and third diodes D1, D2 and D3.

With continued reference to FIG. 2, and specific reference to T to 1.5 T, OUT1-OUT3 are all low such that none of the diodes are activated and the circuit does not emit light. Also, from 1.5 T to 2 T, OUT1-OUT3 are all high and none of the diodes are activated. Accordingly, for the second period, T to 2 T, the circuit 10 emits no light.

In another embodiment as seen in FIG. 2, between 2 T and 2.5 T, OUT2 is low and between 2.5 T and 3 T, OUT2 is high. OUT1 and OUT3 are high for only a portion of this time, which results a selectively-colored light, $L_{T3}$, that includes a mixture of light L1-L4 emitted from all of the diodes D1-D4.

In another embodiment as seen in FIG. 2, OUT2 is low from 2 T to 2.5 T, while OUT2 is high between 2.5 T and 3 T. OUT1 and OUT3 are high for only a portion of each of the first and second halves of the third period, 2 T to 3 T. Although OUT1 and OUT3 are high for only a portion of each of the first and second halves of the third period, 2 T to 3 T, OUT1 and OUT3 are not high for the same length of time during each half of the third period, 2 T to 3 T.

As such, for the third period, 2 T to 3 T, the circuit 10 emits unsaturated, selectively-colored light, $L_{T3}$, that includes a mixture of light L1-L4 emitted from all of the diodes D1-D4.

Figure 3:
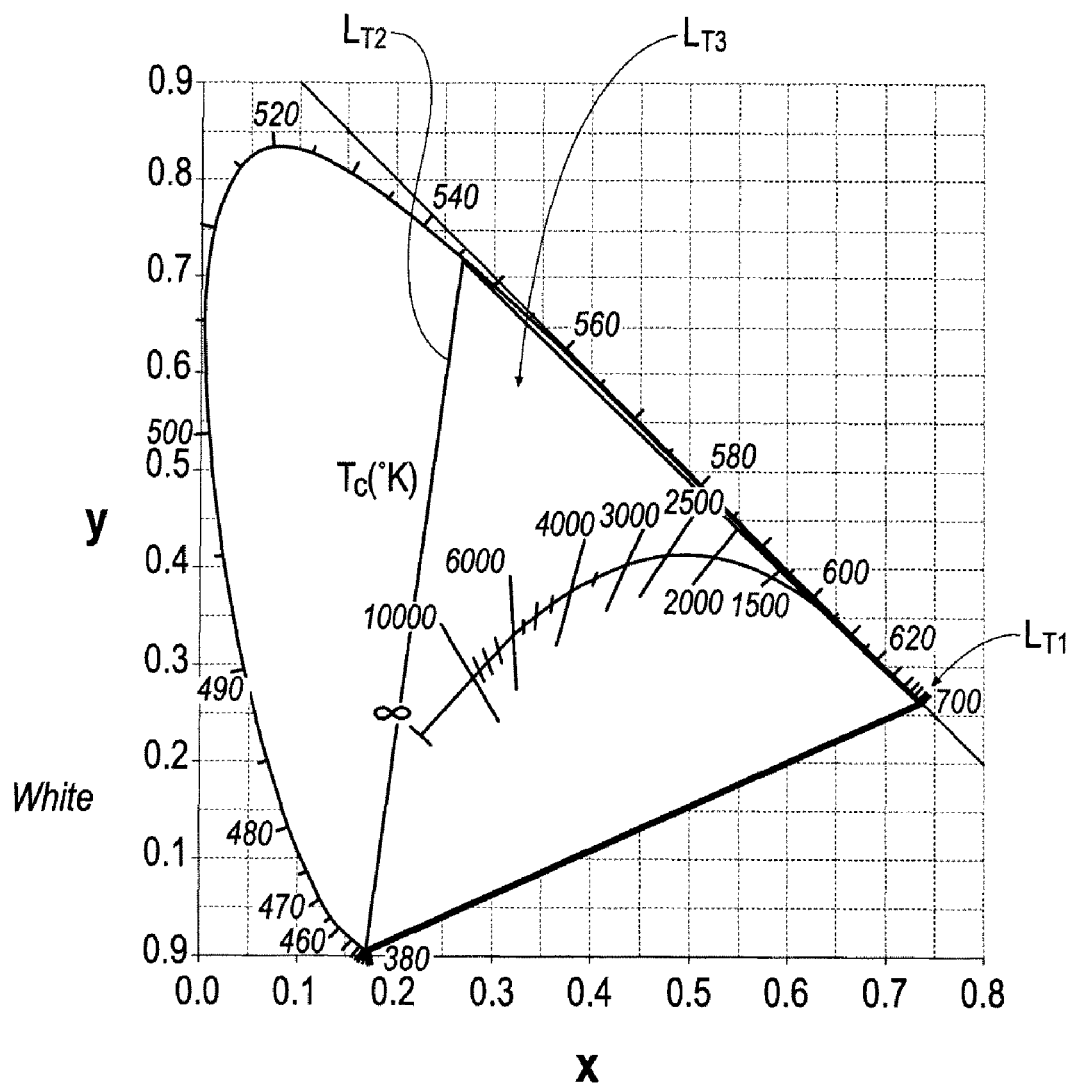
FIG. 3 is an International Commission on Illumination (CIE) chromaticity diagram.

Referring to FIG. 3, a mathematically defined color model is shown. The model is referred to as an International Commission on Illumination (CIE) chromaticity diagram that represents all of the chromaticities visible to the average person. The x, y parameters of the model define the chromaticity of a color. The outer curved boundary of the plot is referred to as the 'spectral locus,' with wavelengths being in nanometers, and corresponds to a saturated, monochromatic light. The straight edge on the lower part of the curve is called the 'line of purples,' that have no counterpart in monochromatic light. Unsaturated colors appear in the interior of the curve with white being approximately located within the middle of the spectral locus and line of purples boundary.

Regarding the examples of the selectively-colored light, $L_{T1}$-$L_{T3}$, from FIG. 2 above, it will be appreciated that the amount of on time and selection of diodes, D1-D4, that are to be activated will result in the circuit 10 being able to produce any saturated or unsaturated color appearing on the CIE chromaticity diagram. For example, the selectively-colored light, $L_{T1}$, may be located on the saturated, outer portion of the curve (i.e., the spectral locus) proximate saturated red (e.g., 700 nm). In another example, the selectively-colored light, $L_{T2}$, may be any unsaturated color on the straight line between saturated green (e.g., 546.1 nm) and saturated blue (e.g., 435.8 nm).

In another example, the selectively-colored light, $L_{T3}$, may include an appearance of having any unsaturated color within or proximate the red-green-blue (RGB) color space formed by a triangle defined by saturated red, saturated green and saturated blue. The provision of the white diode, D4, assists in controlling the selectively-colored light, $L_{T3}$, to be located at any desirable location within the CIE chromaticity diagram. In this embodiment, where three or four diodes have been activated for a period, 2 T to 3 T, it will be appreciated that for the first half of the period, 2 T to 3 T, the available color of the emitted light is located between, for example, a saturated green diode, D2, and a saturated blue diode, D3, whereas, for the second half of the period, 2 T to 3 T, the available color of the emitted light is limited by, for example, a saturated red diode, D1, located on the saturated, outer portion of the curve and a white diode, D4, that may be located at any position within the CIE chromaticity diagram. Because the PWM control signal from OUT2 regulates a very fast on/off time of the diodes, D1-D4, the resulting selectively-colored light, $L_{T3}$, gives the appearance of having an unsaturated color selected from within or proximate the red-green-blue (RGB) color space rather than one color from the combination of the diodes D2, D3 from the first half of the period, 2 T to 3 T, and a another color from the combination of the diodes D1, D4 from the second half of the period, 2 T to 3 T.

Further, as discussed above, it may be desirable to avoid using three diodes to emit white light. In an embodiment diode, D4, may be included as a white diode. In such an embodiment, therefore, D4, may be activated to provide the white light, L4. In this arrangement, OUT3 may be controlled to be high while OUT2 is controlled to be low. In this method, none of the other diodes, D1-D3, are required to be activated to emit white light.

It will be appreciated that normalization of the selectively-colored light, $L_T$, may be provided in any desirable methodology. For example, the color scheme may be conducted by software stored within the controller 12. Alternatively, the color scheme may be provided by designing the circuit 10 to designate specific resistance values of each resistor, R1-R4.

If desired, the circuit 10 may include a user-input, I, that is provided to the controller 12 to manually change the selectively-colored light, $L_T$, to any desirable saturated or unsaturated color. Alternatively, if desired, the circuit 10 may be designed to be fixed in hardware or software to prevent any type of manual deviation of a selectively-colored light, $L_T$, that is set by the designer. Such an implementation of the circuit 10 may be desirable when a designer is designing a color scheme for more than one client; for example, if client A requires a blue/green color, and client B requires a yellow/green color, the designer may work from one design of the circuit 10 while making minor changes in hardware or software to satisfy the each client's needs.

Further, it will be appreciated that the circuit 10 accommodates for a high level voltage of the system to be set to an arbitrary level that must be higher than the LED band gap energy or forward voltage drop. Further, it will be appreciated that circuit 10 may be set for either voltage control or current control.

Figure 4:
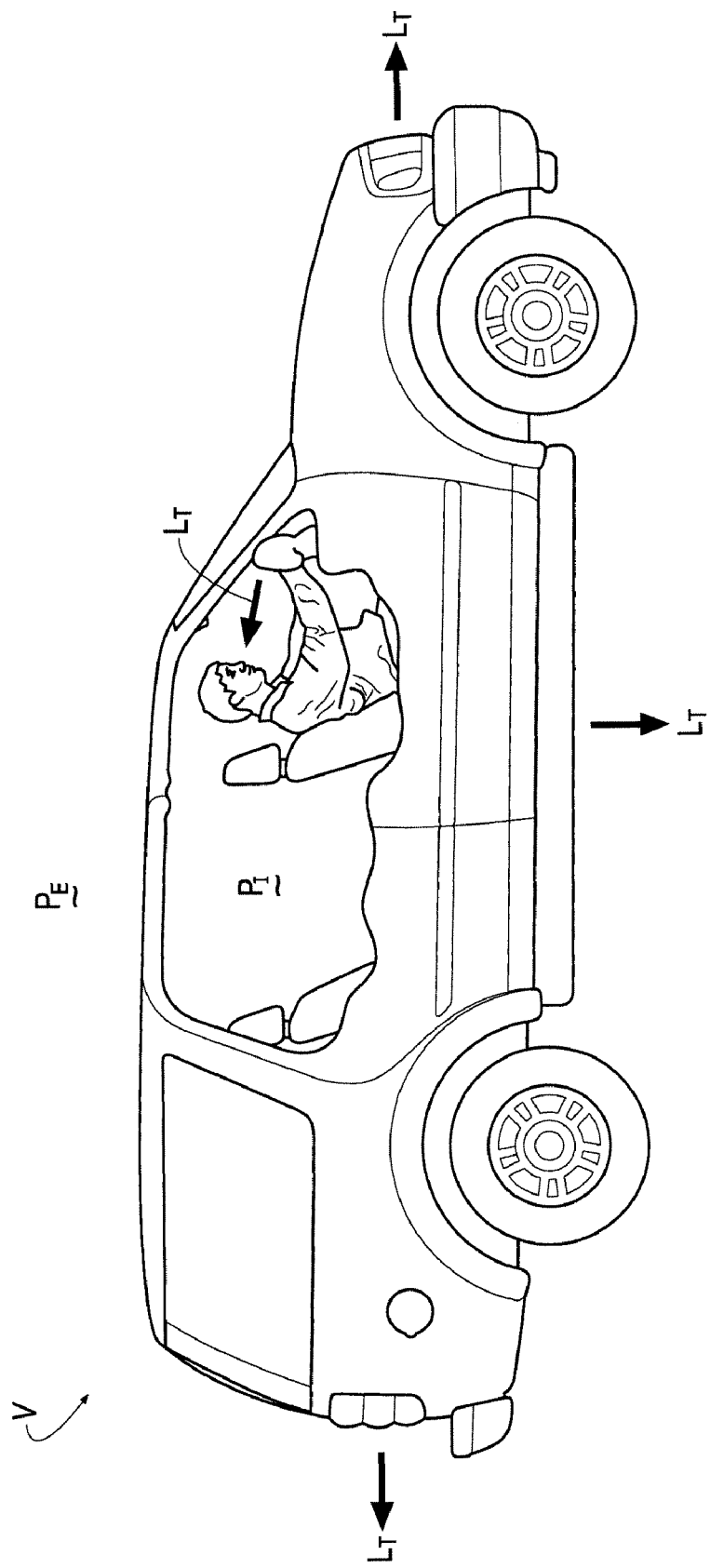
FIG. 4 is an environmental view of a vehicle that includes the circuit of FIG. 1 in accordance with an exemplary embodiment of the invention.

Referring to FIG. 4, the circuit 10 may be implemented with or applied to any desirable good, product or service, such as, for example, a vehicle, V. In an embodiment the selectively-colored light, $L_T$, may be provided to increase or enhance the visibility of the environment with respect to a passenger compartment interior, $P_I$, of the vehicle, V, and/or, an exterior of the passenger compartment, $P_E$, of the vehicle, V.

If the selectively-colored light, $L_T$, is utilized to increase or enhance the visibility of the environment with respect to the interior of the passenger compartment area, $P_I$, the selectively-colored light, $L_T$, may be emitted from any portion of the interior of the vehicle, such as, for example, an instrument panel cluster, the headliner, door panels, trim pillars, trim panels, beverage holders, glove compartments or the like. If, however, the selectively-colored light, $L_T$, is utilized to increase or enhance the visibility of the environment with respect to the exterior of the passenger compartment area, $P_E$, the selectively-colored light, $L_T$, may be sourced to provide light from any portion of the exterior of the vehicle such as, for example, front or rear headlamps, turn-signal lamps, brake lamps, a vehicular chassis/underbody or the like.

Although it is mentioned above that the circuit 10 may be applied to vehicular applications, it will be appreciated that the circuit 10 is not limited to vehicular applications. For example, it will be appreciated that the circuit 10 is applicable to any desirable good, product or service and is not limited to any particular mobile or immobile good, product or service. In an embodiment, the circuit 10 may be associated with a portable media device, such as a cell phone or digital music player. In another embodiment, for example, the circuit 10 may be associated with interior or exterior lighting scheme of a home, business or the like.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. An apparatus for providing selectively-colored light, consisting of:
   a circuit including
      a plurality of diodes each including an anode and a cathode, wherein the plurality of diodes include
         a first diode that emits a first light defined by a first wavelength,
         a second diode that emits a second light defined by a second wavelength, and
         a third diode that emits a third light defined by a third wavelength, wherein a summation of one or more of the first, second and third light defines a selectively-colored light; and
   a controller including
      a first output connected to
         the anode of the first diode, and
         the cathode of the second diode,
      a second output connected to
         the cathode of the first diode,
         the anode of the second diode, and
         the anode of the third diode, and
      a third output connected to
         the cathode of the third diode.

2. The apparatus according to claim 1, wherein each of the first, second, and third wavelengths are unique and inclusive to the visible spectrum approximately ranging between 700 nm and 400 nm.

3. The apparatus according to claim 2, wherein the first diode is a red diode that emits visible red light, wherein the second diode is a green diode that emits visible green light, wherein the third diode is a blue diode that emits visible blue light.

4. The apparatus according to claim 3, wherein the plurality of diodes includes a fourth diode, wherein the second output is connected to the cathode of the fourth diode, wherein the third output is connected to the anode of the fourth diode.

5. The apparatus according to claim 4, wherein the fourth diode emits light selected from the group consisting of white light, ultraviolet light or infrared light.

6. The apparatus according to claim 4 further comprising
   a first resistor disposed between the cathode of the first diode and the second output of the controller,
   a second resistor disposed between the anode of the second diode and the second output of the controller,
   a third resistor disposed between the anode of the third diode and the second output of the controller, and
   a fourth resistor disposed between the anode of the fourth diode and the second output of the controller.

7. The apparatus according to claim 4, wherein the white diode comprises a blue diode covered with a yellowish phosphor coating.

8. The apparatus according to claim 1, wherein the circuit is interfaced with a vehicle, wherein the selectively-colored light is emitted from within a passenger compartment area of the vehicle and/or exterior the passenger compartment area of the vehicle.

9. A method for providing selectively-colored light from the circuit recited in claim 1, comprising the steps of:
   providing a diode control signal to the second output of the controller; and
   permitting an emission of light from one or more of the diodes depending on
      a low or high state of the control signal, and
      a high state of a diode activation signal sent to one or more of the first and third outputs.

10. The method according to claim 9, wherein the control signal is a pulse width modulation (PWM) signal.

11. The method according to claim 10, wherein the duty cycle of the PWM signal is approximately 50%.

12. A method for providing selectively-colored light from a circuit including a controller having first, second and third outputs, said method comprising the steps of:
   connecting the first output of the controller to an anode of a first diode and a cathode of a second diode;
   connecting the second output of the controller to a cathode of the first diode and an anode of the second diode and an anode of a third diode; and
   connecting the third output of the controller to a cathode of the third diode.

13. The method according to claims 12 further comprising the steps of:
   providing a diode on/off control signal to the second output of the controller;
   providing a diode activation signal to each of the first and third outputs; and
   emitting light from one or more of the diodes to provide a saturated or unsaturated light.

14. The method according to claim 13, wherein the on/off control signal is a pulse width modulation (PWM) signal.

15. The method according to claim 14, wherein the duty cycle of the PWM signal is approximately 50%.

16. The method according to claim 14, wherein light emitted from the first diode is permitted to occur during the first half of the period of the PWM signal, wherein light emitted from each of the second and third diodes is permitting to occur during the second half of the period of the PWM signal.

17. The method according to claim 15 further comprising the step of
   connecting the second output of the controller to a cathode of a fourth diode; and
   connecting the third output of the controller to an anode of the fourth diode.

18. The method according to claim 17, wherein light emitted from the fourth diode is permitted to occur during the first half of the period of the PWM signal.

* * * * *